United States Patent [19]
Purcell et al.

[11] Patent Number: 6,094,578
[45] Date of Patent: Jul. 25, 2000

[54] GATEWAY UNIT

[75] Inventors: Thomas E. Purcell, Ellicott City, Md.; Hyuk Byun, Alexandria, Va.; Nuri Bal, Foster City, Calif.

[73] Assignee: American PCS Communications, LLC, Bethesda, Md.

[21] Appl. No.: 08/835,735

[22] Filed: Apr. 10, 1997

Related U.S. Application Data

[60] Provisional application No. 60/030,051, Nov. 6, 1996, provisional application No. 60/025,495, Sep. 12, 1996, and provisional application No. 60/021,490, Jul. 10, 1996.

[51] Int. Cl.$^7$ .................................................. H04M 11/00
[52] U.S. Cl. ........................ 455/426; 455/432; 455/445
[58] Field of Search .................................. 455/403, 410, 455/411, 423, 436, 433, 435, 552, 461, 445; 370/466, 467, 401; 379/219, 229, 230

[56] References Cited

U.S. PATENT DOCUMENTS

| | | | |
|---|---|---|---|
| 5,337,344 | 8/1994 | Alvesalo | 455/426 |
| 5,345,498 | 9/1994 | Mauger | 455/426 |
| 5,420,916 | 5/1995 | Sekiguchi | 379/230 |
| 5,457,680 | 10/1995 | Kamm et al. | 455/432 |
| 5,590,175 | 12/1996 | Gallant et al. | 455/433 |
| 5,610,974 | 3/1997 | Lantto | 455/433 |
| 5,659,596 | 8/1997 | Dunn | 455/461 |
| 5,699,408 | 12/1997 | Krolopp et al. | 455/411 |
| 5,793,771 | 8/1998 | Darland et al. | 370/467 |
| 5,852,660 | 12/1998 | Lindquist et al. | 379/230 |
| 5,854,982 | 12/1998 | Chambers et al. | 455/432 |
| 5,867,788 | 2/1999 | Joensuu | 455/445 |
| 5,889,849 | 3/1999 | Ban et al. | 379/230 |

*Primary Examiner*—Doris H. To
*Assistant Examiner*—Lester G. Kincaid
*Attorney, Agent, or Firm*—Dorsey & Whitney, LLP

[57] ABSTRACT

A gateway unit which acts to provide interoperability between disparate mobile communications networks. The gateway unit provides the necessary protocol conversions between the different mobile networks. The gateway unit can be a stand-alone unit or co-located with a mobile switching center (MSC) wihtin North America or in foreign country. In each case, the gateway unit serves as an interconnection point between two or more networks. For example, the gateway unit converts messages from European networks, which use the International Telecommunications Union (ITU) and mobile global title (MGT) protocols to North American networks, which use the American National Standards Institute (ANSI) and international mobile station identity address (IMSI) protocols, and vis versa. The gateway unit preferably includes the elements of a processor, software and memory, all of which could be provided on a circuit board or in a conventional personal computer. Preferably, the conversions are performed through the use of a series of look-up tables, stored in the memory. Once the incoming messages, from a first communications network, have been converted, subsequently, they are forwarded to their destination in the second communications network.

28 Claims, 10 Drawing Sheets

| ANSI | ITU |
|---|---|
| COO | COO |
| COA | COA |
| CBD | CBD |
| CBA | CBA |
| ECO | ECO |
| ECA | ECA |
| RCT | RCT |
| TFC | TFC |
| TFP | TFP |
| TCP | No Equivalent Message Exists |
| TFR | TFR |
| TCR | No Equivalent Message Exists |
| TFA | TFA |
| TCA | No Equivalent Message Exists |
| RSP | RST |
| RSR | RSR |
| RCP | No Equivalent Message Exists |
| RCR | No Equivalent Message Exists |
| LIN | LIN |
| LUN | LUN |
| LIA | LIA |
| LUA | LUA |
| LID | LID |
| LFU | LFU |
| LLI | LLT |
| LRI | LRT |
| DLC | DLC |
| CSS | DLC |
| CNS | CNS |
| CNP | CNP |
| UPU | No Equivalent Message Exists |

*Fig. 10*

GATEWAY UNIT

RELATED APPLICATIONS

This application claims the benefit of U.S. Provisional Application No. 60/030,051, filed Nov. 6, 1996, U.S. Provisional Application No. 60/025,495, filed Sep. 12, 1996, and U.S. Provisional Application No. 60/021,490, filed Jul. 10, 1996.

BACKGROUND OF THE INVENTION

Basic telephone services have been available for more than a century, but there is still a lot of room for improvement. One such area for improvement is the design of intelligent networks. Intelligent networks are networks which are flexible enough to be compatible and interoperable with other networks utilizing different standards. The advantages such intelligent networks would provide are the capability to offer desired features and functions more quickly, while minimizing the number of required hardware and software changes to network elements.

One of the most significant steps in the development of intelligent networks is the Signalling System 7 (SS7) standard. Signalling System 7 is a standardized packet network architecture that allows the interchange of call control information between switches and databases within and across communication networks.

Although international standards bodies approved Signalling System 7 in 1984, international networks are still far from intelligent or completely interoperable because they use different SS7 protocols and different types of global title addressing. For example, communication networks within North America (herein after collectively called the North American network) use the American National Standards Institute (ANSI) SS7 protocol, while networks outside North America (herein after collectively referred to as the foreign network) use the International Telecommunications Union (ITU) SS7 protocol. In addition, the North American network employs the International Mobile Station Identity (IMSI) type of global title addressing as defined by the International Telecommunications Union (ITU) Recommendation E.212. Whereas, the foreign network uses the Mobile Global Title (MGT) type of global title addressing as defined by ITU Recommendation E.214.

Thus, what is needed is an invention which increases the interoperability of international networks and, thus, allows roaming from one international network to the other.

SUMMARY OF THE INVENTION

The system of the present invention provides subscribers with the capability to receive mobile communications services in different networks through the provision of a gateway unit which acts to provide interoperability and interface between different mobile networks. The gateway unit provides the necessary protocol conversion between the disparate mobile networks. Thus, the function of the gateway unit of the present invention is to convert messages from one to another, analogous to a United Nations interpreter who can accept French input and produce English output.

The gateway system, for example, provides global roaming capabilities for a United States subscriber located in Europe. This functionality is attained even though the United States, and other North American countries, operate under a different set of protocols than most of the other networks located in other countries of the world (hereinafter the "foreign networks").

Specifically, the present invention allows the foreign networks the capability to treat the U.S. subscribers as if they were European subscribers. In this manner, the United States subscriber can receive full access to the same communications features and services, whether away on travel or residing at home. Likewise, the same objectives are achieved for a European or other foreign subscriber traveling in the United States.

This capability is provided by the conversion processes performed in the gateway unit of the present invention. In essence, the gateway unit, or units, serve as interconnection points between two or more disparate networks. The gateway unit may be bilateral or multilateral, that is, it may connect two or more networks. The gateway unit can be a stand-alone unit, co-located with a mobile switching center (MSC) within North America, or co-located with a mobile switching center (MSC) within a foreign country. In each case, however, it must interconnect in some fashion to both networks. Alternatively, the gateway unit functions can be split up between two "half-gateways." In this embodiment, each network would only be responsible for converting to its internal format.

Most countries of the world use the International Telecommunications Union (ITU) and mobile global title (MGT) protocols. North American networks, however, typically use the American National Standards Institute (ANSI) and international mobile station identity address (IMSI) protocols. Briefly stated, the gateway unit of the present invention converts messages from one set of the aforementioned protocols to the other.

Assuming a North American subscriber desiring access in a European network, for example, the European switch must first receive the subscriber's IMSI address and create an MGT address. This conversion allows the switch to forward the roaming signal through the European network, and ultimately, to the gateway unit. Once the roaming signal is received at a mobile switching center, it is directed to the gateway unit.

The gateway unit is interconnected to both the European and U.S. networks. The gateway unit preferably comprises the elements of a processor, software and memory, all of which could be provided on a circuit board or in a conventional personal computer. The memory preferably contains a series of look-up tables that are used in the conversion process. In this example, the gateway unit performs the protocol translation of signals from the European format to the North American format. The translation of the signals from one protocol to another requires translating the point code, SS7 protocol and the subscriber's global title address. Under the direction of the processor, these elements are preferably translated using the look-up tables. Once the signal has been converted, the roaming signal is forwarded through the North American network to it's destination point. In most instances, the destination will be the subscriber's home location register. The subscriber's home location register contains the authentication, servicing and billing information necessary to serve the subscriber in the foreign network. Such information is subsequently passed back through the North American network and on to the European network. Once this information is received at the European switching facility, the North American subscriber can be provided mobile phone services.

In a similar manner, the gateway unit provides for servicing a foreign subscriber traveling in North America. However, the conversion processes, discussed above, are reversed.

Thus, the system of the present invention is a considerable improvement over the prior art because it provides interoperability between the North American network and the foreign network, which is transparent to the user.

It is an object of the present invention to provide interoperability between the international mobile communications networks.

It is an object of the present invention to convert signals in a format associated with a first international communications network into a different format required by a second international communications network. It is an object of the present invention to process the translation of a subscriber's global title address from the type of global title addressing used by a first communications network into the type required by the second communications network.

BRIEF DESCRIPTION OF THE DRAWINGS

FIG. 10 shows a sample conversion table for maintenance messages.

DETAILED DESCRIPTION OF THE INVENTION

The present invention is a system for allowing mobile communication subscribers to make and receive calls from any location in the world using a single mobile service account. Using this system, a person subscribing to a mobile service network outside of the North American network (i.e., a foreign subscriber) can make and receive calls when traveling in North America. Similarly, a person subscribing to a mobile service network within the North American network (i.e., a North American subscriber) can make and receive phone calls when traveling abroad.

Figure 1:
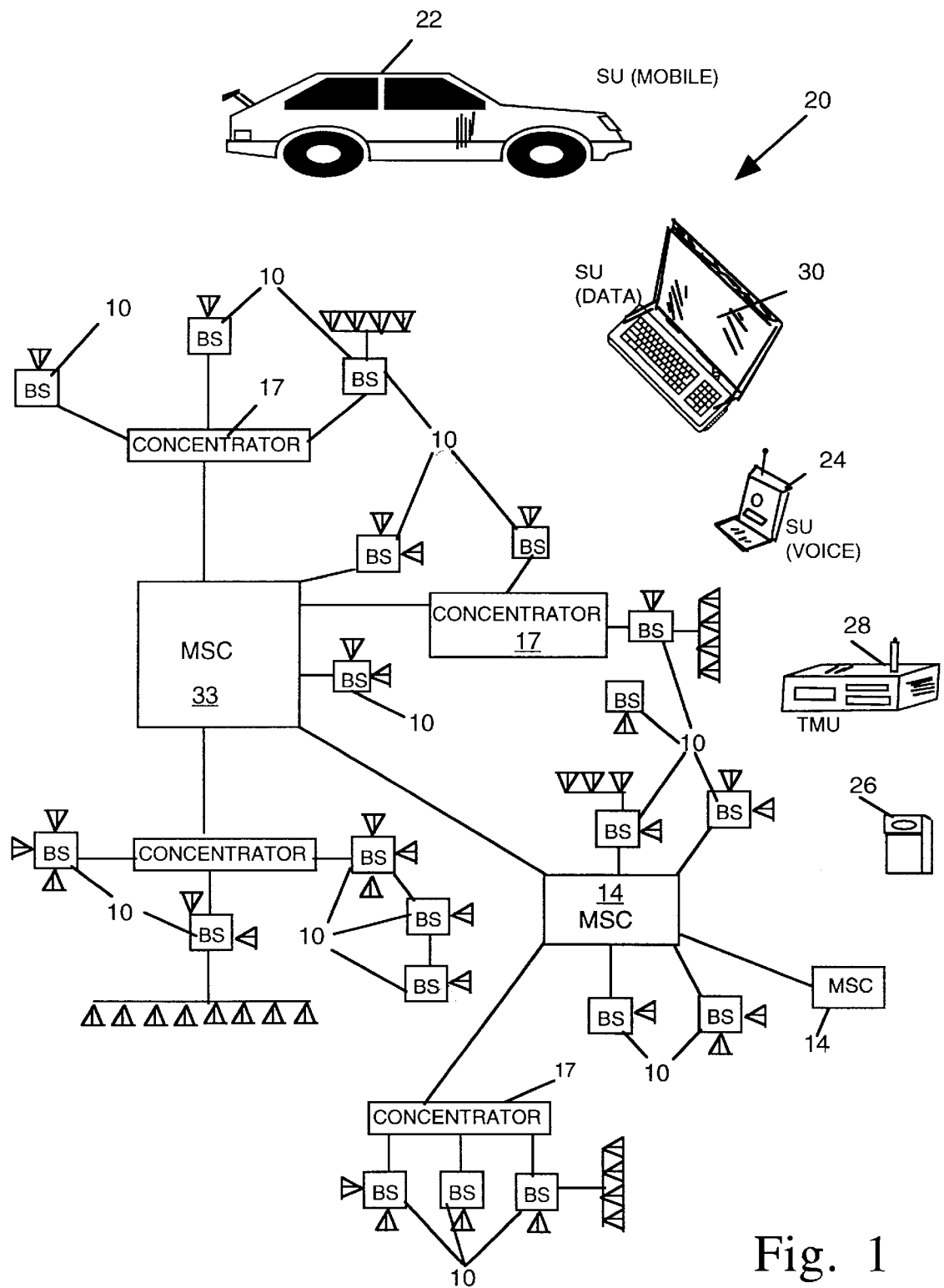
FIG. 1 shows a diagram of a mobile communications network in North America.

FIG. 1 shows a diagram of a typical communications network in North America. A subscriber can access the North American network using a subscriber unit 20, as shown in FIG. 1. The subscriber unit 20 can be any mobile communications unit with a personalized card, including such units as shown in FIG. 1 (e.g., a car phone 22, portable computer 30, mobile phone 24, pager 26, or test mobile unit 28). Preferably, the gateway unit 90 of the present invention is located at the same facility as the mobile switching center (MSC) 33. However, the gateway unit 90 can also be a stand-alone unit or co-located with foreign network elements, such as a mobile switching center (MSC) or signal transfer point (STP).

In the preferred embodiment, the gateway unit 90 provides an interconnection between the North American and foreign networks. Thus, the mobile switching center 33 must be capable of interfacing with the foreign network, i.e., receiving and sending signals to the foreign network.

The Gateway Unit

Figure 2:
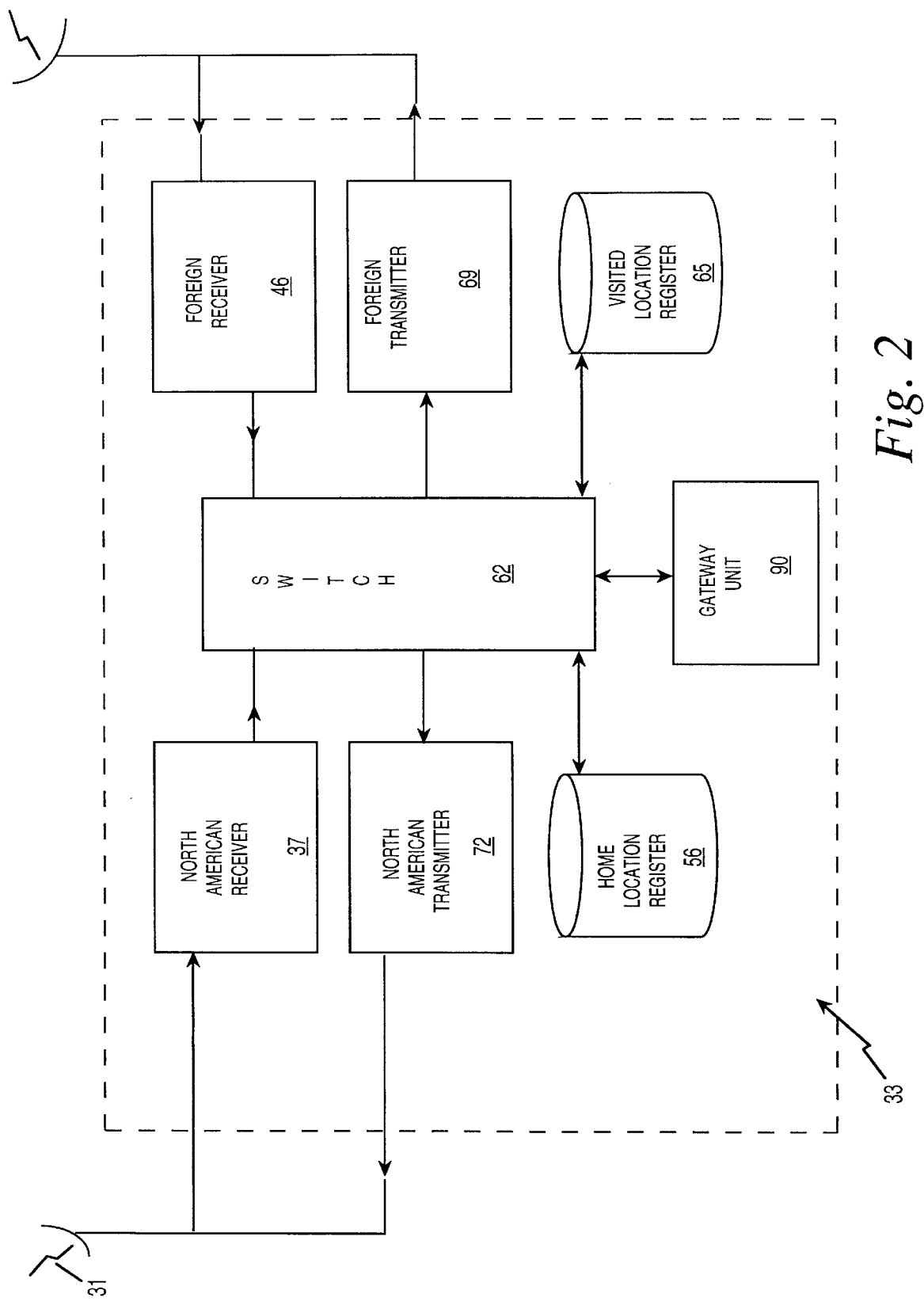
FIG. 2 shows a schematic of the components of a mobile switching center (MSC) facility, including a gateway unit.

As shown in FIG. 2, the MSC 33 probably includes two receivers 37, 46, two transmitters 69, 72, a visited location register 65, a home location register 56, a switch 62 and the gateway unit 90. The redundancies in the transmission and receive equipment are necessary because the North American network and foreign network are not compatible in terms of signal waveform, access scheme, etc. The foreign receiver 46 receives and processes signals from the foreign network. Likewise, the North American receiver 37 receives and processes those signals emanating from the North American network. The North American and European transmitters 72, 69 process and transmit signals to other network elements (such as concentrators, other MSC's, or base stations) in the North American and foreign networks, respectively.

If signals come into the message switching center 33 and protocol conversion is required, the switch 62 directs the signals to the gateway unit 90. The gateway unit 90 performs the necessary protocol conversions and forwards the converted messages back to the switch 62. Thereafter, the switch 62 re-routes the messages to the address set forth in the converted messages.

Figure 3:
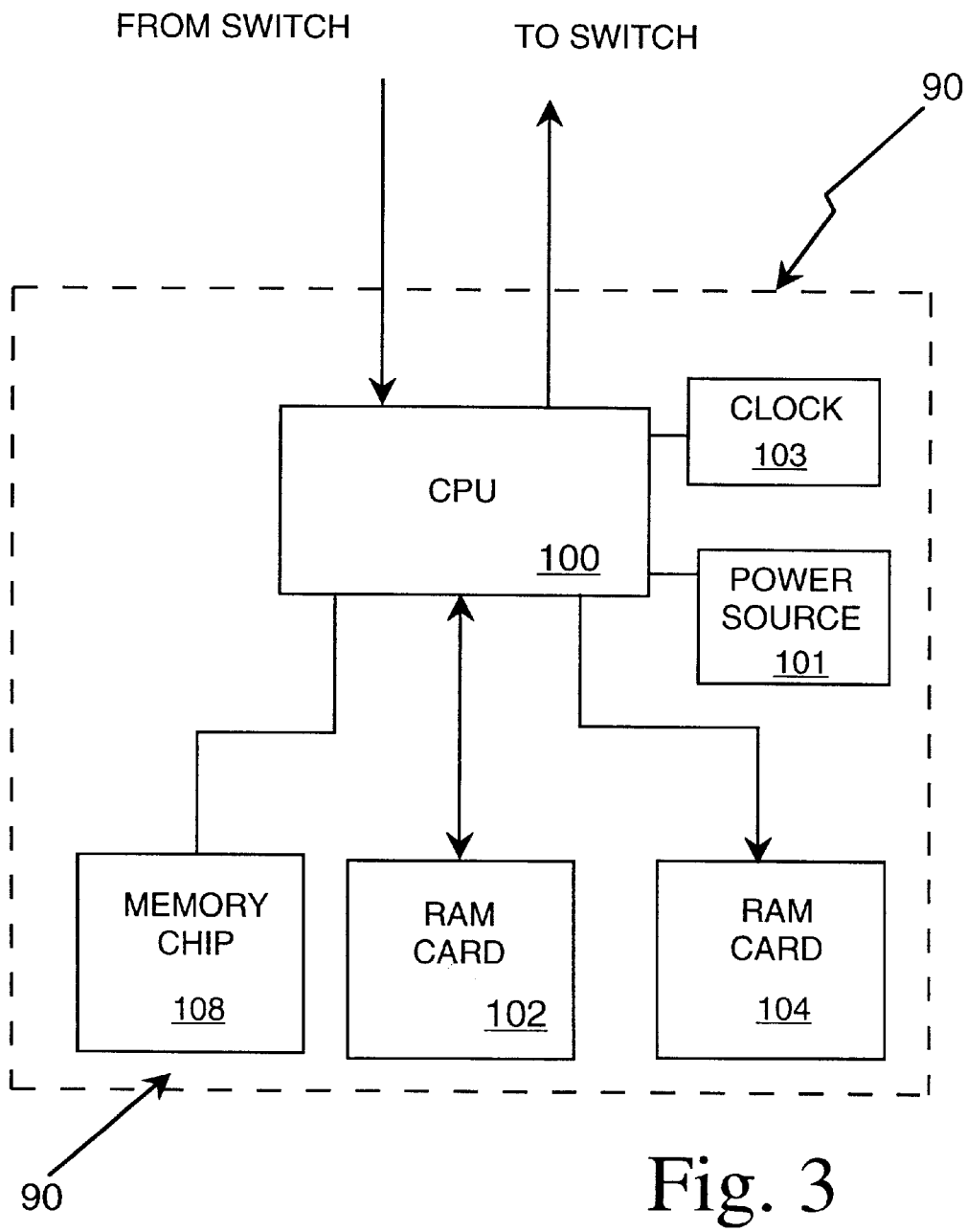
FIG. 3 shows the configuration of the gateway unit.

As shown in FIG. 3, the gateway unit 90 preferably comprises a processor 100, two RAM cards 102, 104, a clock 103, a memory chip 108, and a power source 101. These elements can be provided in a board or in a conventional personal computer. In the preferred embodiment, the two RAM cards 102, 104 are the size of a credit card. Each RAM card stores about 3.5 MB in a magnetic strip. The RAM cards 102, 104 store routing information, conversion tables (active and standby) and translation software.

Preferably, the necessary protocol conversions are accomplished through the use of look-up tables or conversion tables. The conversion tables contain the necessary information for translating messages from the North American message format into the foreign message format, and visa versa. Alternatively, protocol conversion could also be implemented through the use of neural networks or digital signal processing elements.

In the preferred embodiment, active and stand-by conversion tables are stored in each RAM card 102. The stand-by conversion tables allow the mobile service provider to make modifications in the active conversion tables off-line with only minimal interference in customer service. The memory cards are preferably RAM because they need to be continually modified. In the preferred embodiment, these RAM cards 102, 104 are protected from power outages due to automatic downloading of stored information into the memory chip 108 when the power is turned off or disrupted.

When power is resumed, the memory chip 108 automatically uploads the information back into the cards 102, 104.

In the preferred embodiment, the memory chip 108 is a nonvolatile memory device, such as EPROM. In alternative embodiments, the memory chip 108 and memory cards 102, 104 may be RAM, ROM, EPROM, EEPROM, or FLASHROM. The processor 100 is preferably an Intel 80386 or 80486, or any other commercially available processor.

Several protocol conversions are performed by the gateway unit 90. The North American network uses an ANSI message protocol and IMSI global title address (ANSI/IMSI message format), and the foreign network uses an ITU message protocol and a Mobile Global Title (MGT) global title address (ITU/MGT message format). In addition, the networks may use different frequencies and/or coding, compression or modulation techniques. The present invention acts as an interface between the two networks translating the ANSI/IMSI message format into the ITU/MGT message format, and visa versa.

Figure 4:
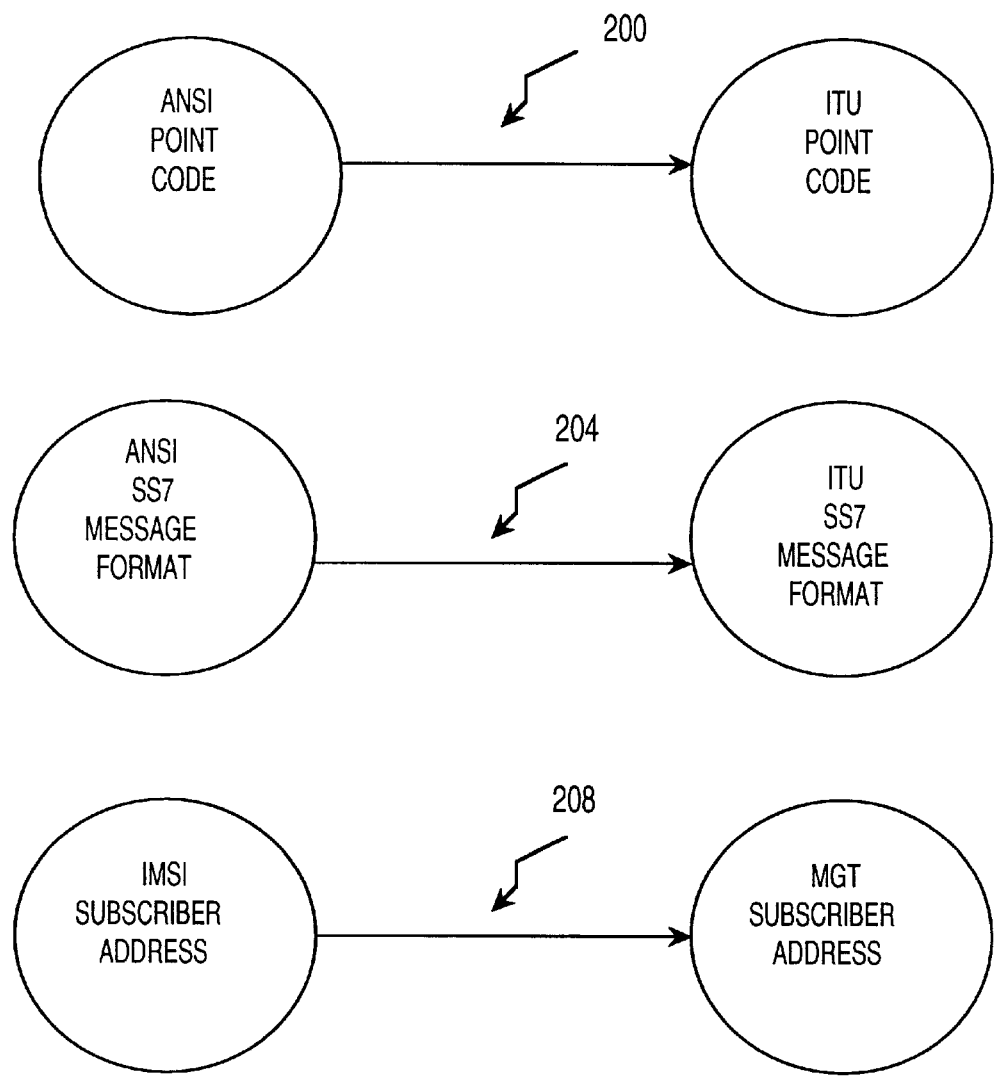
FIG. 4 shows the conversions necessary for translating messages, at the gateway unit, from North American mobile communications standards to Foreign mobile communications standards.

When a foreign subscriber is traveling in the United States, the gateway unit must convert from the ANSI protocols to the ITU protocols, as shown in FIG. 4. The ANSI point code must be translated to an ITU point code. The ANSI SS7 message format is translated to an ITU SS7 message format. And finally, the IMSI subscriber address is translated to an MGT subscriber address. In this manner, signals can be forwarded to the European network, as explained in greater detail below.

Figure 5:
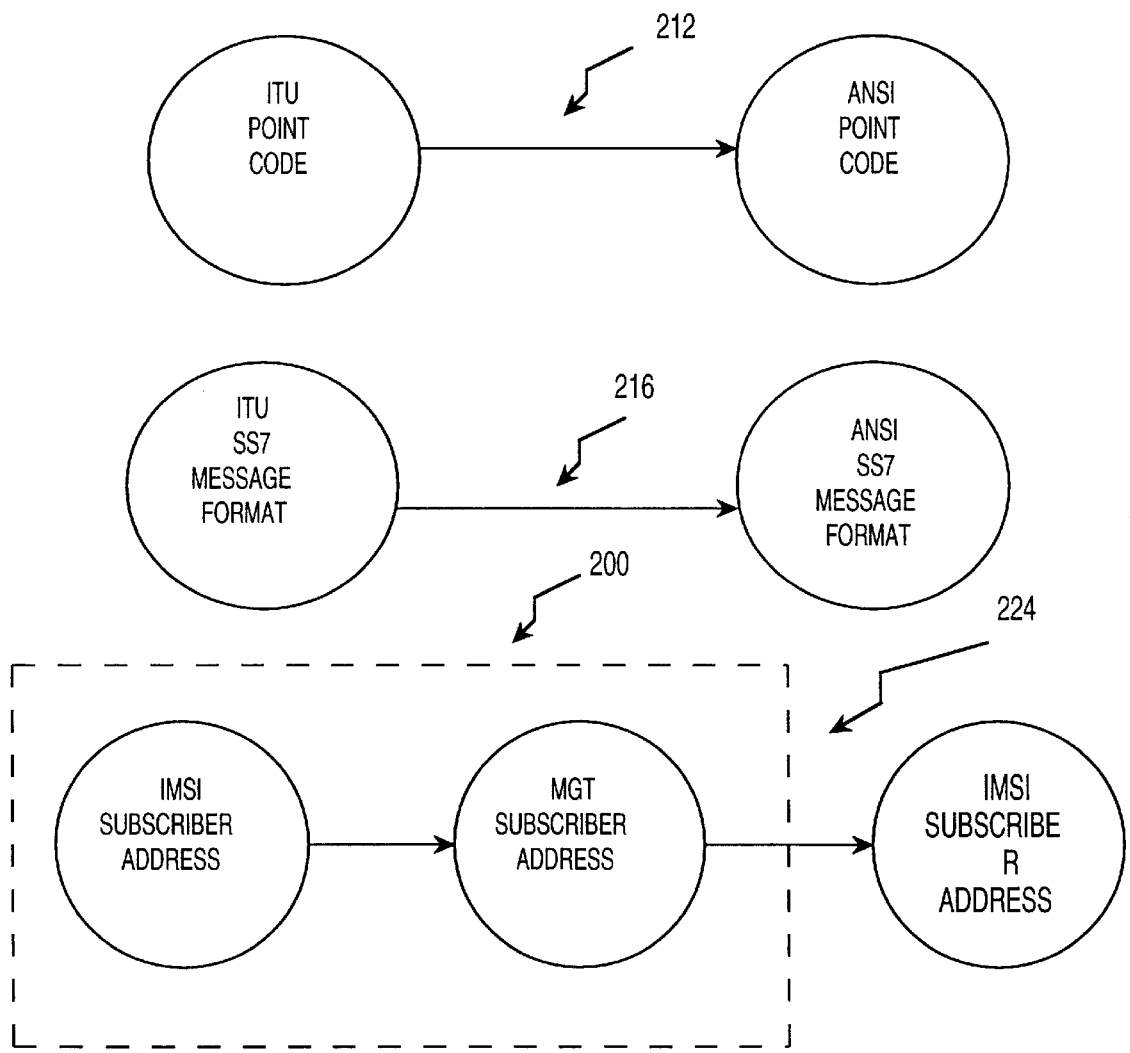
FIG. 5 shows the conversions necessary for translating messages, at the gateway unit, from Foreign communications standards to North American communications standards.

Further, the gateway unit performs the conversions for a North American subscriber located in Europe. The necessary translations are shown in FIG. 5. These translations are essentially the converse of those translations, shown in FIG. 4, for a European subscriber located in the United States. That is, the ITU point code is translated into an ANSI point code. Further, the ITU SS7 message format is translated into the ANSI SS7 message format. However, an intermediate step is required in the translation of the subscriber address. Once a European switch receives a signal from the North American subscriber, the switch must first convert the IMSI subscriber address, only associated with the North American network, to an MGT address. This conversion is necessary in order to route roaming messages through the European network, prior to receipt at the gateway unit. Once these messages are received at the gateway unit, the address is converted back into the IMSI format. These processes are described in greater detail in the paragraphs below.

Foreign Subscriber in North America

The functions and processes of the gateway unit with respect to a foreign subscriber can be explained best by reference to an example. In this example, a European subscriber accesses the network in New York, for example, with the gateway unit located in Merrifield, Va. It is assumed that the subscriber's home network is in Paris, France. Referring back to FIG. 1, a European subscriber would access the North American network using a subscriber unit 20 which is compatible with the North American network. The foreign subscriber can use a North American subscriber unit 20 by simply removing their standard personalized card from their foreign subscriber unit and placing it in the North American subscriber unit 20.

The subscriber's personalized card contains information which uniquely identifies the subscriber. It allows any accessed network the capability to locate the network where the subscriber is registered (i.e., the subscriber's home network). In this example, therefore, the card allows the North American network the capability to determine that the visitor is registered in the European network. Specifically, the personalized card may contain a number of subscriber identifying elements, including the subscriber's (1) phone number, (2) system password, (3) global title address, and (4) location area identities.

However, authorized services and billing information are not typically included on the personalized card. Services and billing information for the subscriber are located in a database within the subscriber's home network, in this case, at a switch in Paris, France. This database is called the subscriber's home location register (HLR). As a result, in order to service and bill the subscriber, the North American network must obtain the subscriber's servicing and billing information from the subscriber's home location register. This can be accomplished by performing the necessary protocol translations at the gateway unit 90 and using the subscriber's identifying information, stored on the card, to access the subscriber's HLR.

The foreign subscriber initiates the system of the present invention when they place their personalized card in the North American subscriber unit 20 and turn it "ON." When the subscriber unit 20 is turned "ON," it transmits a "send parameters message" with the subscriber's identifying information over RF communication links to a base station 10, somewhere in the New York City area. This "send parameters message" is transmitted in two parts: the ITU E.212 portion and the ITU E.164 portion. Once the base station 10, as shown in FIG. 1, receives the "send parameters message" from the subscriber unit 20, it relays it to a North American Mobile Switching Center (MSC) 14.

When the MSC 14 receives the "send parameters message," it stores the subscriber's identifying information in its visited location register and routes an "authentication and registration message" through the mobile network to an MSC 33 containing a gateway unit 90, in this example, the MSC 33 in Merrifield, Va. In the preferred embodiment, the gateway unit 90 is located at the MSC 33. The initial MSC 14 knows to transmit the "authentication and registration message" to the MSC 33 because of the IMSI address, contained within the "send parameters message." This MSC 33 has both a North American network address and a foreign networks address and, thus, appears to be a North American MSC to other North American MSC's, while appearing to be a foreign MSC to other foreign MSC's. Further, with the gateway unit 90 of the present invention, it contains the necessary hardware and software to receive messages from either network and to transmit messages to either network.

The "authentication and registration message" is received at the MSC 33 and is demodulated, decrypted, etc., in the North American receiver. The message is then forwarded to the switch 62. The switch 62 determines if the message was sent by a foreign subscriber by examining the IMSI address. If so, the message is forwarded from the switch to the gateway unit 90, as shown in FIGS. 2 and 3.

The gateway unit's processor 100 executes software to perform the translations from the North American format to the foreign format, as shown in FIG. 4. To perform this translation, the gateway unit must translate the following items: (1) the 24 bit ANSI point code, (2) the ANSI SS7 message format, and (3) the global title address.

Point Code Translation

With respect to the point code translation, the North American network uses a 24 bit ANSI point code. The foreign network, conversely, uses a 14 bit ITU point code. The 24 bit ANSI point code uses the first 8 bits to identify a country, the second 8 bits to identify a network, and the last 8 bits to identify a machine within the network. The 14 bit ITU point code uses the first 3 bits to identify a country, the next 8 bits to identify a network, and the last 3 bits to identify a machine.

The translation from the 24 bit ANSI point code to the 14 bit ITU point code occurs at the lowest two layers of the SS7 protocol, the Message Transfer Part (MTP) and Signalling Connection Control Part (SCCP). The gateway unit 90, either implemented on a circuit board or personal computer, translates the point codes within the MTP and SCCP layers of the received SS7 protocol by passing the 24 bit ANSI point code to the processor 100. The processor 100 executes the translation by accessing the active conversion table in its RAM card 102. The processor then translates the first 8 bits of the ANSI point code into the first 3 bits of the ITU point code, the second 8 bits in the ANSI point code into the second 8 bits in the ITU point code, and the last 8 bits in the ANSI point code into the last 3 bits of the ITU point code.

For example, if the gateway unit 90 receives a 24 bit ANSI point code representing a point code address like "3-30-6." The gateway unit 90 translates the 24 bit ANSI point code into a 14 bit ITU address by translating the eight bit ANSI field representing "3" into a 3 bit ITU field, the eight bit ANSI field representing "30" into a 8 bit ITU field, and the eight bit ANSI field representing "6" into a 3 bit ITU field.

However, in some instances the North American networks have point code addresses like "2-20-77," which are too large to map into a 14 bit ITU address. Specifically, the number "77" is too large to map into a 3 bit field. To solve this problem, the processor 100 creates a fake number equivalent to "2-20-77," which is capable of mapping into an ITU point code, such as "2-20-7." The processor 100 creates the fake number based on a conversion table stored in a RAM card. This conversion table equates any North American network address which is too large to map into the 14 bit ITU point code with an equivalent address which is capable of mapping into a 14 bit ITU point code.

SS7 Message Format Translation

The second protocol translation performed by the gateway unit 90 is the conversion of the SCCP's global title formats and values of the message from ANSI SS7 format to ITU SS7 format. Before the second translation, the SCCP layer of the "authentication and registration message" is first separated from the SS7 protocol stack 112.

The gateway unit 90 executes the second translation by using the processor 100 to map the Translation Type value used in the North American network into the independent values used by the foreign network. Specifically, in the North American network, the "authentication and registration message" is routed using the Global Title Translation Type values in the SCCP layer defined by the ANSI SS7 protocol.

Figure 6A:
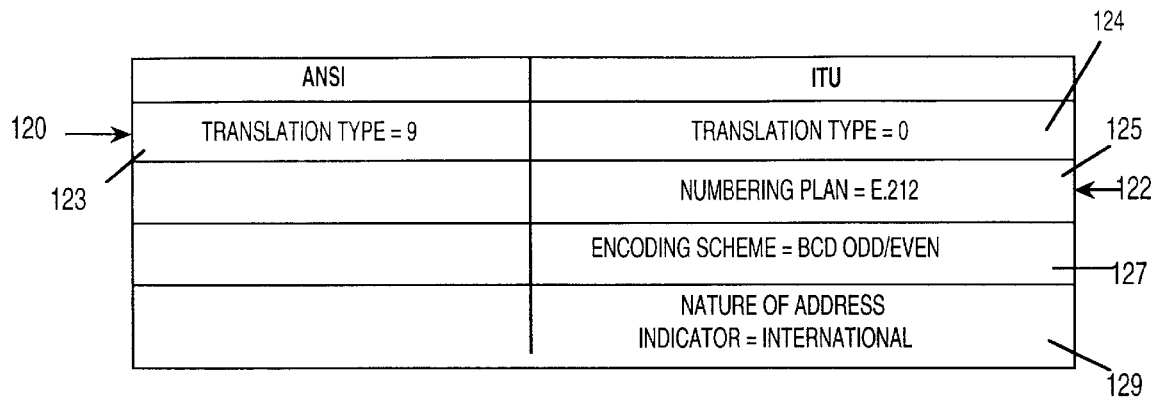
FIG. 6a shows the mapping table used to translate an ANSI format with a Translation Type=9 into its equivalent ITU format and visa versa.
Figure 6B:
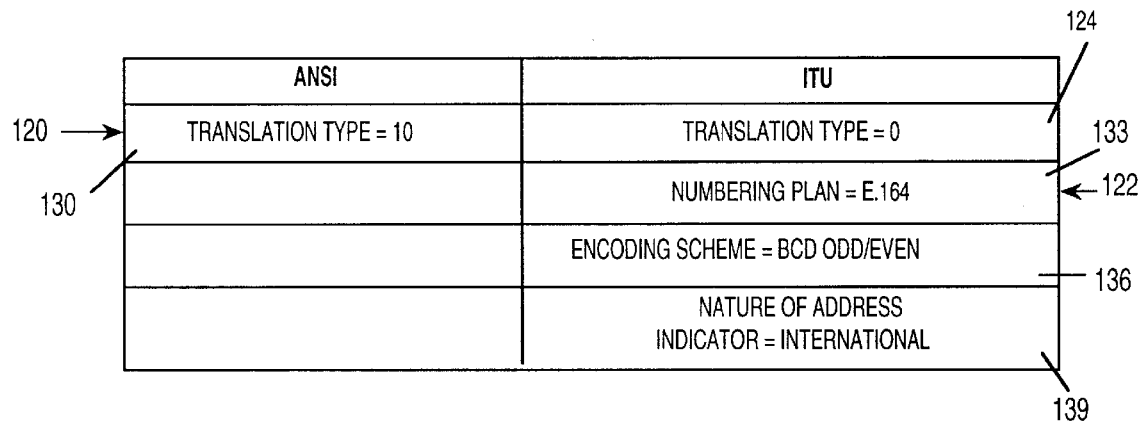
FIG. 6b shows the mapping table used to translate an ANSI format with a Translation Type=10 into its equivalent ITU format and visa versa.
Figure 6C:
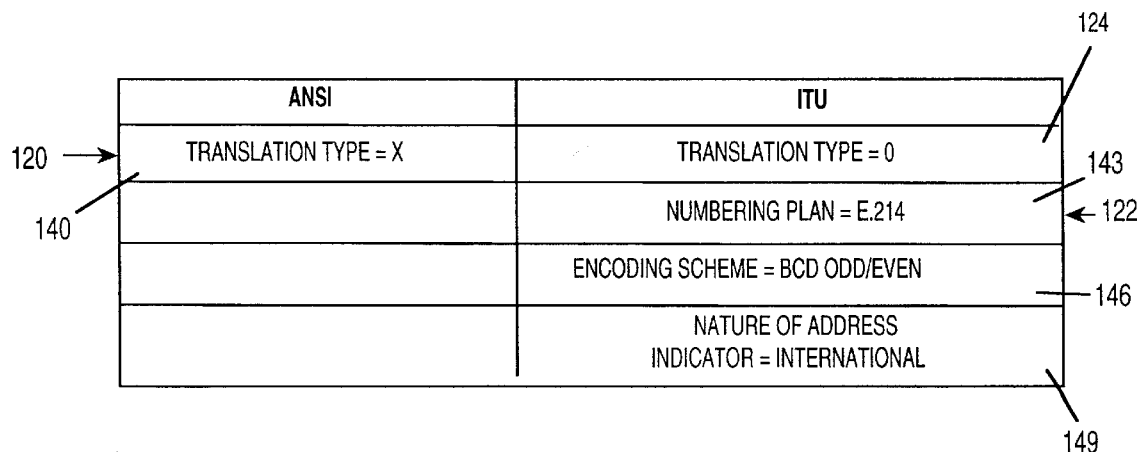
FIG. 6c shows the mapping table used to translate an ANSI format with a Translation Type=X into its equivalent ITU format and visa versa.

As shown in FIGS. 6a–6c, the North American Translation Type values 120 are equivalent to the foreign protocol's specific Numbering Plan 122, Encoding Scheme 127, and Nature of Address Indicator 129. In contrast, the foreign network does not collectively group the Numbering Plan 122, Encoding Scheme 127, 136, 146, and Nature of Address Indicator 129, 139, 149 under the Global Title's Translation Type value 120.

The foreign network sets the Translation Type value 124 to zero and uses independent values for each. The conversion tables required for the processor 100 to perform these translations are stored in the RAM cards 102, 104.

FIGS. 6a–6c show three examples of the mapping tables used in the second translation of the ANSI SCCP global title formats and values into the ITU SCCP global title formats and values. FIG. 6a shows an example of the translation of an ANSI SS7 protocol with Translation Type=9 (123) into its equivalent ITU SS7 protocol, and visa versa. The gateway unit 90 performs this translation by equating the Translation Type=9 (123) to the Numbering Plan=ITU E.212 (125), Encoding Scheme=BCD Odd/Even 127, and Nature of Address Indicator=International 129, used in the ITU SS7 protocol. Similarly, the processor 100 equates the Numbering Plan=ITU Recommendation E.212 (125), Encoding Scheme=BCD Odd/Even 127, and Nature of Address Indicator=International 129, into the Translation Type=9 (123). FIGS. 6b and 6c show conversion tables for the Translation Type=10 (130) and Translation Type=X (140). Translation Type=10 (130) identifies a Numbering Plan= ITU Recommendation E.164 (133), and Translation Type=X (140) identifies Numbering Plan=E. 214 (143). The value of X can be any value uniquely used to identify a Number Plan=ITU Recommendation E.214 (143).

Address Translation

Prior to forwarding the authentication and registration message to the foreign subscriber's home location register, the gateway unit 90 must perform the translation of the IMSI global title address to the MGT global title address. As mentioned above, the type of global title addressing used in the North American network is International Mobile Station Identity (IMSI) 92, as defined by ITU recommendation E.212, herein incorporated by reference. The type of global title addressing used in the foreign networks is Mobile Global Title (MGT), as defined in ITU Recommendation E.214, herein incorporated by reference.

Figure 7:
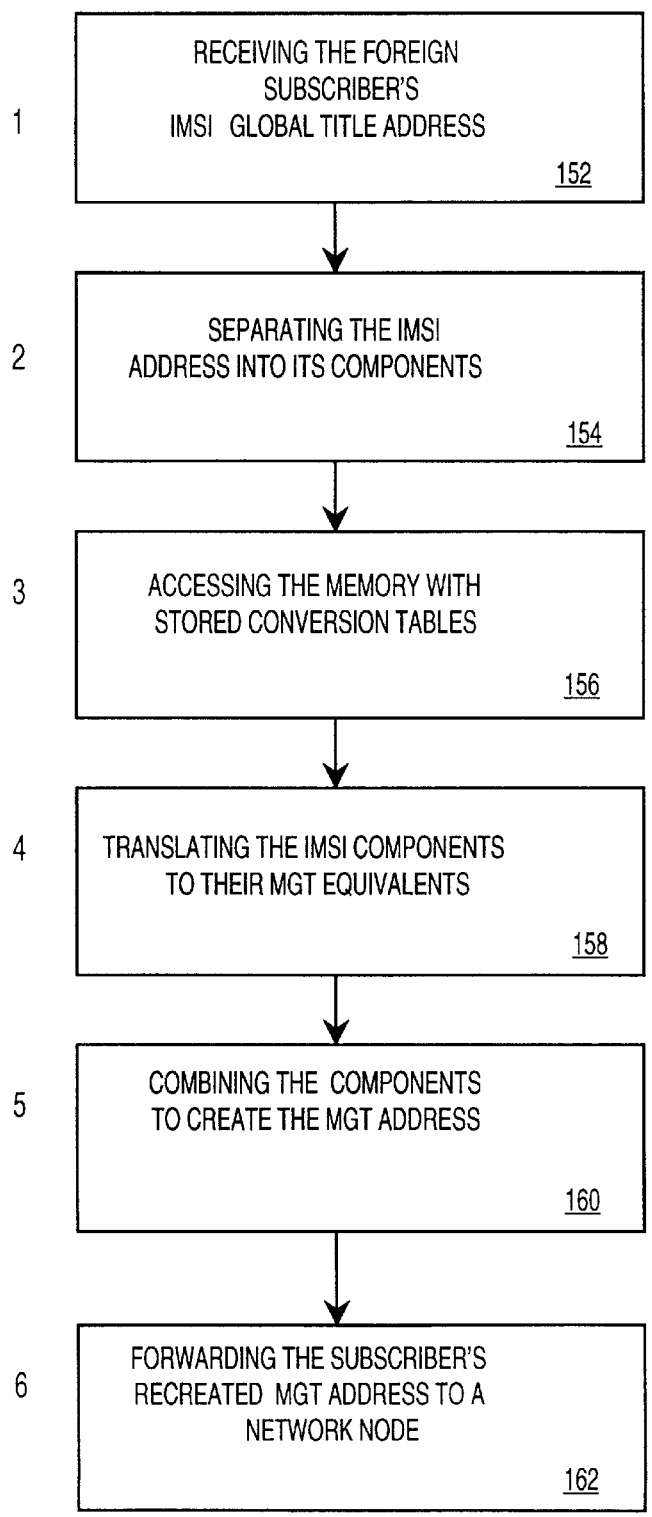
FIG. 7 shows the steps in the process of translating a subscriber's global title address.

The gateway unit's 90 process of translating the subscriber's global title address is shown in FIG. 7. The first step of the process is for the gateway unit 90 to receive the foreign subscriber's IMSI global title address 152. Next, the gateway unit 90 separates the IMSI global title address into its component parts 154.

Figure 8A:
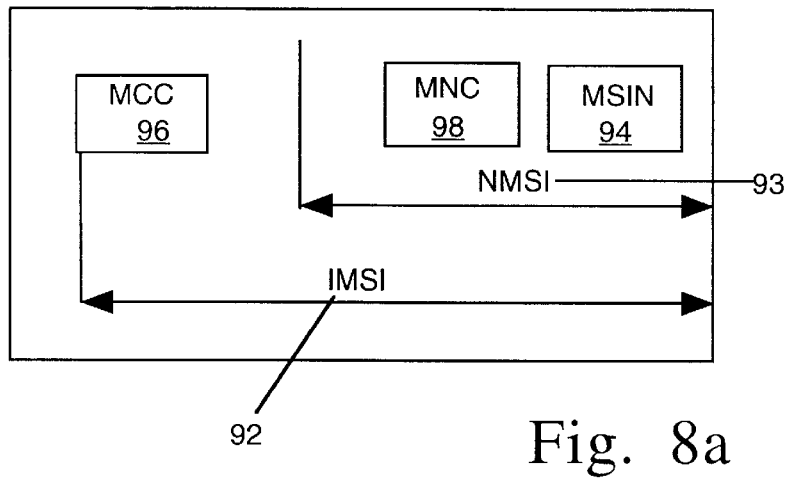
FIG. 8a shows the contents of the international mobile station identity (IMSI) address, as defined in ITU Recommendation E.212.

Prior to continuing the discussion of the process, it is informative to provide an overview of the IMSI components. As shown in FIG. 8a, the IMSI address comprises a Mobile Country Code (MCC) 96 and national mobile station identity 93 (NMSI). The MCC 96 consists of three (3) digits. The MCC 96 uniquely identifies the country of the subscriber's home network, in this case France.

The two parts comprising the NMSI 93 are the Mobile Network Code (MNC) 98 and the Mobile Station Identification Number (MSIN) 94. The MNC 98 is a digit or combination of digits that uniquely identifies the subscriber's home network. The MSIN 94 is a series of digits that uniquely identifies the location of the subscriber's home location register within the subscriber's home network.

Figure 8B:
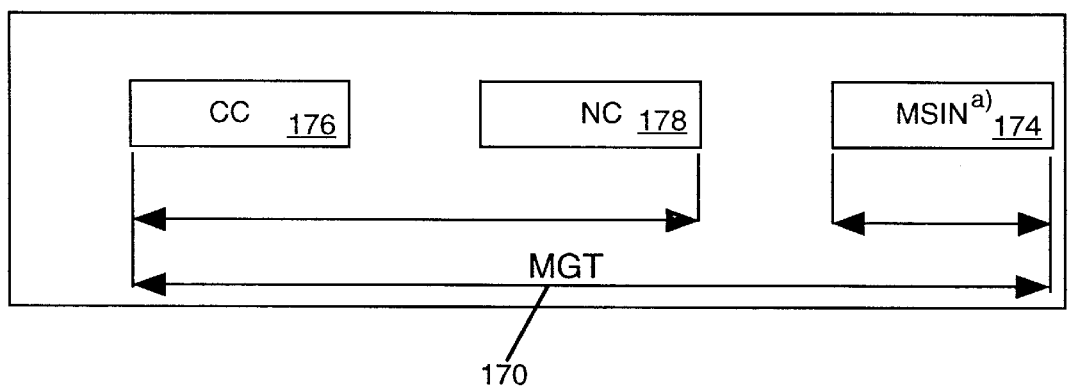
FIG. 8b shows the contents of the mobile global title (MGT) address, as defined in ITU Recommendation E.214.

As shown in FIG. 8b, the mobile global title (MGT) address, associated with foreign networks, is formatted differently from the IMSI address. The MGT 170 is of variable length and composed of decimal digits arranged in two specific parts, identified by ITU Rec.'s E.164 and E.212. The E.164 portion comprises a country code 176 and a network code 178. Further, the E.164 portion is used to identify the country and network associated with the subscriber's home location register. The E.212 part is composed of the mobile station identification number (MSIN) 174, as defined in ITU Recommendation E.212, and is used to locate the subscriber's home location register.

The gateway unit 90 processes the translation of the foreign subscriber's IMSI global title address into their equivalent MGT global title address 158 by accessing the conversion tables 156, preferably stored in the RAM cards 102, 104. The conversion tables are look-up tables which allow the processor 100 to equate and translate the components of the IMSI global title address 92 into the components of the MGT global title address 50. For example, the processor 100 can use the Mobile Country Code 96 to locate its equivalent Country Code 176 in the conversion tables. Next, the processor 100 can use the Mobile Network Code 98 and Mobile Station Identification Number 94 to look-up the corresponding Network Code 178. The IMSI Mobile Station Identification Number 94 is used to look up the MGT Mobile Station Identification Number 174. The MGT mobile station identity number 174 may be different than IMSI MSIN 94 because the foreign network may truncate the MSIN. After the third translation, the components of the IMSI global title address are recombined 160, as shown in FIG. 7, to create the MGT address 170.

Once the point code, message format and address translations are completed, the gateway unit 90 forwards the converted message 162 back to the MSC switch 62. The MSC 33 then transmits the "authentication and registration message" to the foreign subscriber's home network based on their global title address. Thus, the MSC 33 transmits a message compatible with the foreign network (i.e., ITU/MGT) to locate the foreign MSC associated with the foreign subscriber's home location register.

When the "authentication and registration message" is received at the MSC associated with the foreign subscriber's home network, this MSC locates the foreign subscriber's home location register to obtain their servicing and billing information. This MSC also verifies that the foreign subscriber's information is unique (i.e., different from any other active user). This action prevents people from copying the subscriber's information and fraudulently using their account. If the foreign subscriber's information is authentic, the foreign subscriber's home network registers the foreign subscriber's location for routing of incoming phone calls. In addition, this foreign MSC also downloads the foreign subscriber's servicing and billing information to the visited location register of the MSC 14 which received the foreign subscriber's "send parameters message."

The services that can be downloaded from the foreign network to the North American network are previously agreed to in a bilateral agreement between the mobile service providers operating each network. As a result, the MSC 14 which received the foreign subscriber's "send parameters message" can service and bill the foreign subscriber, even though the foreign subscriber is registered in a foreign network. The types of services a foreign subscriber can receive include the following: (1) making and receiving calls; (2) call forwarding; (3) call waiting; (4) call blocking; and (5); any other service the foreign subscriber is registered to receive in their home network and which is permitted to be downloaded under the mobile service provider's agreement.

If the North American MSC 33 is unable to transmit the "authentication and registration message" directly to the MSC containing the foreign subscriber's home location register, the "authentication and registration message" is routed through the foreign network in a hierarchal and sequential manner using the components of the foreign subscriber's MGT address 170.

Translation of Maintenance Messages

There is a another translation performed by the gateway unit 90, unrelated to the making or receiving of a telephone call. This translation pertains to the exchange of maintenance messages between the foreign subscriber's subscriber unit and their home network. Similar to the other translations, these translations are performed by the gateway unit 90, preferably based on conversion tables stored in the RAM cards 102, 104. The table for this translation is shown in FIG. 10. The first column represents the three letters used to represent a North American or ANSI maintenance message. The second column shows the equivalent three letters used to identify that maintenance message in the foreign network. Typically, the three letters used to identify a maintenance message are the same.

A North American Subscriber Travelling Abroad

The present invention also allows a North American subscriber to make and receive calls while traveling abroad. The system works the same way as described above with reference to the foreign subscriber traveling in North America, except the three translations are performed in reverse manner. And instead of using the IMSI address to locate the MSC 33 containing the gateway unit 90, the foreign MSC creates an MGT address 170 from the E.212 and E.164 numbers transmitted by the North American subscriber's unit to locate such an MSC 33. As described above, once the MSC 33 receives the authentication and "send parameters" message from the foreign network, the switch 62 directs the message to the gateway unit 90. As shown in FIG. 5, the gateway unit 90 performs the point code, SS7 and subscriber address translations.

The first translation involves translating the foreign ITU point code to an ANSI point code, as shown in FIG. 5. The second translation is the conversion from the ITU SS7 message format to the ANSI SS7 point code. These translations are merely the reverse of the translations shown in FIGS. 6a to 6c.

Figure 9:
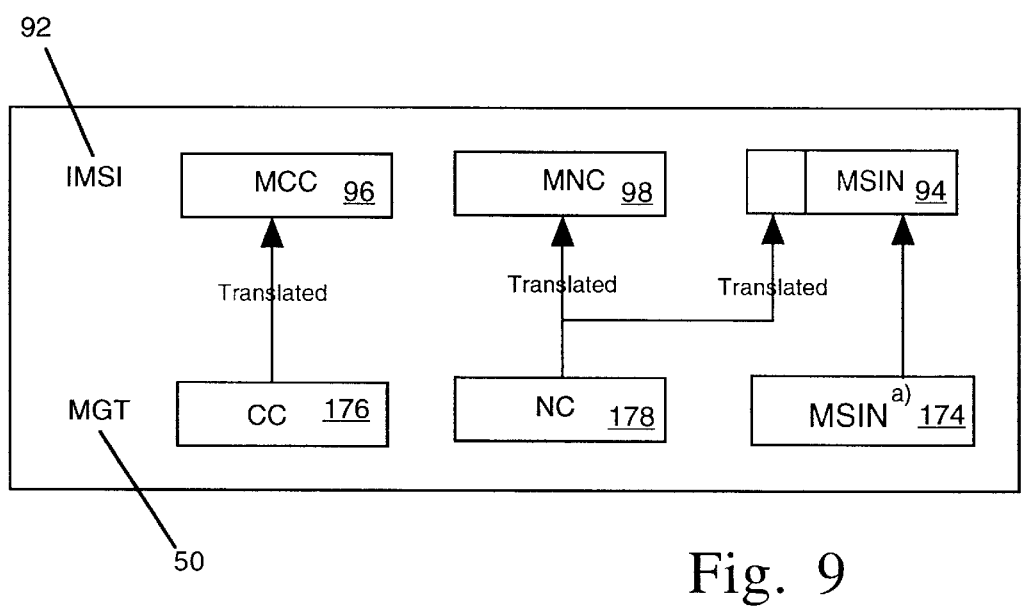
FIG. 9 shows an example of how the mobile global title address is translated into the international mobile station identity address.

The subscriber address translation is the final translation. The processor 100 can translate the MGT address 170 into the IMSI address 92 using the same conversion tables, as discussed above, as regarding the foreign subscriber in the United States. FIG. 9 shows this conversion. Specifically, the processor 100 can use the country code 176 to locate its equivalent IMSI mobile country code 96 in the conversion tables. The processor 100 then uses the network code 178 to recreate mobile network code 98 and to provide additional information to recreate the IMSI North American mobile station identity number 94. Third, the processor 100 uses the MGT mobile station identity number 174 to recreate the remaining portion of the IMSI mobile station identity number 94.

The gateway unit 90 of the present invention has been described as an interconnection point between two networks. However, this invention can also serve as an interconnection point and interface between more than two disparate networks. Further, while the gateway unit 90 has been described as located at a North American MSC facility, it could also be a located at other network elements, act as a stand-alone unit, or be located at foreign network elements.

Alternatively, the gateway unit functions can be split up between two "half gateways." In this embodiment, each network would be responsible for performing one-way protocol translations, i.e., either to its own internal protocols for incoming traffic or to those protocols of the interfaced network for outgoing traffic. For example, a first gateway unit could be located at an MSC in the North American network and a second gateway unit could be located at an MSC in the foreign network. The first gateway unit would only make protocol conversion from ITU/MGT to its own internal format, i.e., the ANSI/IMSI format. The second gateway unit, on the other hand, would perform the protocol conversions from the ANSI/IMSI format to the ITU/MGT format.

The foregoing description of the present invention has been presented for purposes of illustration and description. The description is not intended to limit the invention to the forms described. Variations and modifications commensurate with the above teachings, and within the skill and knowledge of the relevant art, are part of the scope of the present invention.

What is claimed is:

1. A gateway system for translating signals between international mobile communications networks, wherein a signal contains at least one formatted message, a point code and subscriber address information, the system comprising:
    a means for receiving one or more signals from a first international mobile communications network;
    a means for converting the formatted message and subscriber address information from a first signaling protocol format associated with the first international mobile communications network to a second signaling protocol format associated with a second international mobile communications network;
    a means for converting the point code from a first point code format associated with the first international mobile communications network to a second point code format associated with the second international mobile communications network, wherein the means for converting utilizes one or more fake numbers corresponding to a point code that cannot be truncated from the first point code format to the second point code format without altering its value; and
    a means for forwarding the converted signals to the second international mobile communications network, whereby interoperability is provided between the first and second international mobile communications networks based on the conversion of the signals.

2. The gateway system of claim 1, wherein the converting means further comprises memory, the memory containing conversion tables.

3. The gateway system of claim 2 wherein the conversion tables contain the one or more fake numbers.

4. The gateway system of claim 1 wherein the first point code format utilizes 24 bits and the second point code format utilizes 14 bits.

5. A gateway system for translating signals between international mobile communications networks, the system comprising:
    a means for receiving one or more signals from a first international mobile communications network;
    wherein the received signals contain point code, SS7 formatted messages, and subscriber address information;
    a means for converting the received signals from a first signaling protocol format associated with the first international mobile communications network to a second signaling protocol format associated with a second international mobile communications network;
    wherein the converting means converts the point code, SS7 messages, and subscriber address information from the first signaling protocol format associated with the first international mobile communications network to the second signaling protocol format associated with the second international mobile communications network, wherein the converting means utilizes one or more fake numbers corresponding to a point code that cannot be truncated from the first signaling protocol format to the second signaling protocol format without altering its value; and
    a means for forwarding the converted signals to the second international mobile communications network, whereby interoperability is provided between the first and second international mobile communications networks based on the conversion of the signals.

6. The gateway system of claim 5 wherein the first signaling protocol format utilizes 24 bits to represent a point code and the second signaling protocol format utilizes 14 bits to represent a point code.

7. The gateway system of claim 5 wherein the means for converting further comprises a conversion table containing the one or more fake numbers.

8. A gateway system for translating signals between international mobile communications networks, the system comprising:
    a means for receiving one or more signals from a first international mobile communications network;
    wherein the received signals contain a point code in an American National Standards Institute format, at least one message in an American National Standards Institute SS7 format, and a subscriber address in an international mobile station identity address format;
    a means for converting the received signals from a first signaling protocol format associated with the first international mobile communications network to a second signaling protocol format associated with a second international mobile communications network;
    wherein the converting means converts the point code into an International Telecommunications Union format, the message into an International Telecommunications Union SS7 format, and the subscriber address to a mobile global title address, wherein the converting means utilizes one or more fake numbers corresponding to a point code that cannot be truncated from the American National Standards Institute format to the International Telecommunications Union format without altering its value; and
    a means for forwarding the converted signals to the second international mobile communications network, whereby interoperability is provided between the first and second international mobile communications networks based on the conversion of the signals.

9. The gateway system of claim 8 wherein the converting means further comprises a conversion table containing the one or more fake numbers.

10. A gateway system for providing global roaming capabilities for a foreign mobile network subscriber located in a North American mobile communications network, the subscriber having service, billing and other identifying information located at a home location register in Europe, the system comprising:
    a receiver, wherein the receiver receives a first signal containing an international mobile station identity address from the foreign subscriber;
    wherein the received first signal further contains a point code in an American National Standards Institute format and at least one message in an American National Standards Institute format SS7 format;
    a processing mechanism, operably connected to the receiver, wherein the processing mechanism converts the subscriber's international mobile station identity address into a mobile global title address;

wherein the processing mechanism converts the received point code into an International Telecommunications Union format utilizing one or more fake numbers corresponding to a point code that cannot be truncated from the first American National Standards Institute format to the International Telecommunications Union format without altering its value, and wherein the processing mechanism converts the received message into an International Telecommunications Union SS7 format; and a transmitter, operably connected to the processing mechanism, wherein the transmitter transmits a second signal based on the subscriber's converted mobile global title address to the subscriber's home location register, thereby allowing the foreign subscriber to receive mobile communications services in North American networks.

11. The gateway system of claim 10 wherein the processing mechanism further comprises a conversion table containing the one or more fake numbers.

12. A gateway system for providing global roaming capabilities for one or more foreign mobile network subscribers located in a North American mobile communications network, the subscriber having service, billing and other identifying information located at a home location register in Europe, the system comprising:

at least one subscriber unit, wherein the subscriber unit transmits at least one signal containing a point code, messages and subscriber address, and wherein the point code, messages and subscriber address are formatted according to a North American mobile standard format;

a base station, in communication with the subscriber unit, for receiving the signals from the subscriber unit;

a mobile switching center, operably connected to the base station, wherein the mobile switching center receives the signals from the base station, the mobile switching center comprising a gateway unit, the gateway unit comprising:

a processor mechanism;

a means for converting, connected to and operating under the direction of the processor mechanism, the received signals from the North American mobile standard format to a European Standard format;

wherein the converting means converts the subscriber address, point code and formatted messages from the North American mobile standard format to the European Standard format, wherein the converting means utilizes one or more fake numbers corresponding to a point code that cannot be truncated from the North American mobile standard format to the European Standard format without altering its value; and a transmitter, connected to the converting means, for transmitting at least the converted subscriber address to the subscriber's home location register in the European network.

13. The gateway system of claim 12, wherein the converting means further comprises memory, the memory containing conversion tables.

14. The gateway system of claim 13 wherein the conversion tables contain the one or more fake numbers.

15. The gateway system of claim 12 wherein the North American mobile standard format utilizes 24 bits to represent a point code and the European standard format utilizes 14 bits to represent a point code.

16. A gateway system for providing global roaming capabilities for one or more foreign mobile network subscribers located in a North American mobile communications network, the subscriber having service, billing and other identifying information located at a home location register in Europe, the system comprising:

at least one subscriber unit, wherein the subscriber unit transmits at least one signal containing a point code, messages and subscriber address;

wherein the received signals contain point code, SS7 formatted messages, and subscriber address information in a North American format;

a base station, in communication with the subscriber unit, for receiving the signals from the subscriber unit;

a mobile switching center, operably connected to the base station, wherein the mobile switching center receives the signals from the base station, the mobile switching center comprising a gateway unit, the gateway unit comprising:

a processor mechanism;

a means for converting, connected to and operating under the direction of the processor mechanism, the received signals from the North American format to a European format;

wherein the converting means converts the point code, SS7 messages, and the subscriber address information from the North American format to the European format, wherein the converting means utilizes one or more fake numbers corresponding to a point code that cannot be truncated from the North American format to the European format without altering its value; and a transmitter, connected to the converting means, for transmitting at least the converted subscriber address to the subscriber's home location register in the European network.

17. The gateway system of claim 16 wherein the North American format utilizes 24 bits to represent a point code and the European format utilizes 14 bits to represent a point code.

18. The gateway system of claim 16 wherein the converting means further comprises a conversion table containing the one or more fake numbers.

19. A gateway system for providing global roaming capabilities for one or more foreign mobile network subscribers located in a North American mobile communications network, the subscriber having service, billing and other identifying information located at a home location register in Europe, the system comprising:

at least one subscriber unit, wherein the subscriber unit transmits at least one signal containing a point code, messages and subscriber address;

wherein the received signals contain a point code in an American National Standards Institute format, at least one message in an American National Standards Institute SS7 format, and a subscriber address in an international mobile station identity address format;

a base station, in communication with the subscriber unit, for receiving the signals from the subscriber unit;

a mobile switching center, operably connected to the base station, wherein the mobile switching center receives the signals from the base station, the mobile switching center comprising a gateway unit, the gateway unit comprising:

a processor mechanism;

a means for converting, connected to and operating under the direction of the processor mechanism, the received signals;

wherein the converting means converts the point code into an International Telecommunications Union format, the message into an International Telecommunications Union SS7 format, and the subscriber address to a mobile global title address, wherein the converting means utilizes one or more fake numbers corresponding to a point code that cannot be truncated from the American National Standards Institute format to the International Telecommunications Union format without altering its value; and a transmitter, connected to the converting means, for transmitting at least the converted address to the subscriber's home location register in the European network.

20. The gateway system of claim 19 wherein the converting means further comprises a conversion table containing the one or more fake numbers.

21. A method comprising:

receiving a point code in a first point code format;

if the received point code cannot be truncated from the first point code format to a second point code format without altering its value; then:

creating a fake number associated with the received point code, the fake number in the form of the first point code format and capable of being truncated from the first point code format to the second point code format without altering its value; and mapping the fake number to a converted point code in the second point code format, whereby the received point code is converted from a first point code format to the second point code format.

22. The method of claim 21 further comprising:

receiving one or more signals from a first international mobile communications network, wherein the one or more received signals contain the received point code;

converting the one or more received signals from a first signaling protocol format associated with the first international mobile communications network to a second signaling protocol format associated with a second international mobile communications network; and forwarding the converted signals to the second international mobile communications network, whereby interoperability is provided between the first and second international mobile communications networks based on conversion of the signals.

23. The method of claim 22 wherein the one or more received signals further contains at least one formatted message and subscriber address information, the method further comprising:

converting the at least one formatted message and subscriber address information from the first signaling protocol format to the second signaling protocol format.

24. The method of claim 21 wherein first point code format is a North American format.

25. The method of claim 21 wherein first point code format is an American National Standards Institute format.

26. The method of claim 21 wherein second point code format is a European format.

27. The method of claim 21 wherein second point code format is a International Telecommunications Union format.

28. A gateway system for translating signals between international mobile communications networks, wherein a signal contains at least one formatted message, a point code and subscriber address information, the system comprising:

a means for receiving one or more signals from a first international mobile communications network;

a means for converting the formatted message and subscriber address information from a first signaling protocol format associated with the first international mobile communications network to a second signaling protocol format associated with a second international mobile communications network;

a means for converting the point code from a first point code format associated with the first international mobile communications network to a second point code format associated with the second international mobile communications network, wherein the means for converting utilizes one or more fake numbers corresponding to a point code that cannot be truncated from the first point code format to the second point code format without altering its value;

a means for forwarding the converted signals to the second international mobile communications network;

a means for receiving one or more signals from the second international mobile communications network;

a means for converting the one or more received signal from the second signaling protocol format associated with the second international mobile communications network to the first signaling protocol format associated with the first international mobile communications network; and a means for forwarding the converted signals to the first international mobile communications network, whereby interoperability is provided between the first and second international mobile communications networks based on the conversion of the signals.

* * * * *